United States Patent [19]

Mori

[11] 3,988,950

[45] Nov. 2, 1976

[54] FRICTIONAL GEARING APPARATUS

[76] Inventor: Kiyoshi Mori, No. 48, 1-chome, Tenjinnomori, Nishinari, Osaka, Japan

[22] Filed: Aug. 21, 1975

[21] Appl. No.: 606,435

[30] Foreign Application Priority Data

Jan. 11, 1975 Japan .................................. 50-5796

[52] U.S. Cl. .................................... 74/798; 74/772; 74/206

[51] Int. Cl.² .......................................... F16H 13/06

[58] Field of Search .............. 74/798, 772, 206, 208

[56] References Cited

UNITED STATES PATENTS

| | | | |
|---|---|---|---|
| 1,528,530 | 3/1925 | Coffee | 74/206 |
| 1,585,140 | 5/1926 | Erban | 74/798 |
| 1,995,689 | 3/1935 | Shively | 74/772 |
| 3,077,124 | 2/1963 | Juenke | 74/798 |
| 3,208,307 | 9/1965 | Agren | 74/798 |
| 3,793,907 | 2/1974 | Nakamura | 74/798 |

*Primary Examiner*—Samuel Scott
*Assistant Examiner*—Allan R. Burke
*Attorney, Agent, or Firm*—George B. Oujevolk

[57] ABSTRACT

A frictionally gearing apparatus. This apparatus comprises two shafts accommodated in a cylindrical casing, extending in opposite directions or in a same direction reaching out of said casing, said shafts being employed for the input and the output either fixedly or in alternation. Said shafts each has a rotary object confronting each other within said casing, said rotary objects varying in diametrical length and each forming a friction surface at their confronting portions, further a plurality of frictionally-surfaced globular members of a same size diametrically measuring next to the bigger rotary object being provided between the aforementioned rotary objects so as to make rotational, frictional contacts simultaneously with said rotary objects thereby enabling the increase or decrease of the input rotation through its two-step transmission to the output via said rotary objects and said globular members.

2 Claims, 3 Drawing Figures

FRICTIONAL GEARING APPARATUS

This invention relates to a speed change apparatus and more particularly a speed change apparatus for accelerating or decelerating the rotation of a shaft at the output, said speed change being accomplished through the transmission of input to output through the medium of frictionally contacting rotary members provided in between.

Various types of apparatuses of this kind have been introduced, and what distinguishes this invention therefrom lies in a multiplied speed changing efficiency enabled by the provision of globular rotary members having a high friction coefficient.

A first object of this invention is to provide a speed change apparatus for accelerating or decelerating the rotation of a shaft at the output through the transmission of input to output via frictionally contacting rotary members.

A second object of this invention is to provide an apparatus as above-mentioned available for rotary machinery of kinds in a wide range.

A third object of this invention is to provide an apparatus as above further characterized in flexibility of its mechanism enabling the choice of input and output in alternation.

In order that this invention may be readily understood, a reference will be made to preferred embodiments of this invention in relation to the annexed drawing as following.

Figure 1:
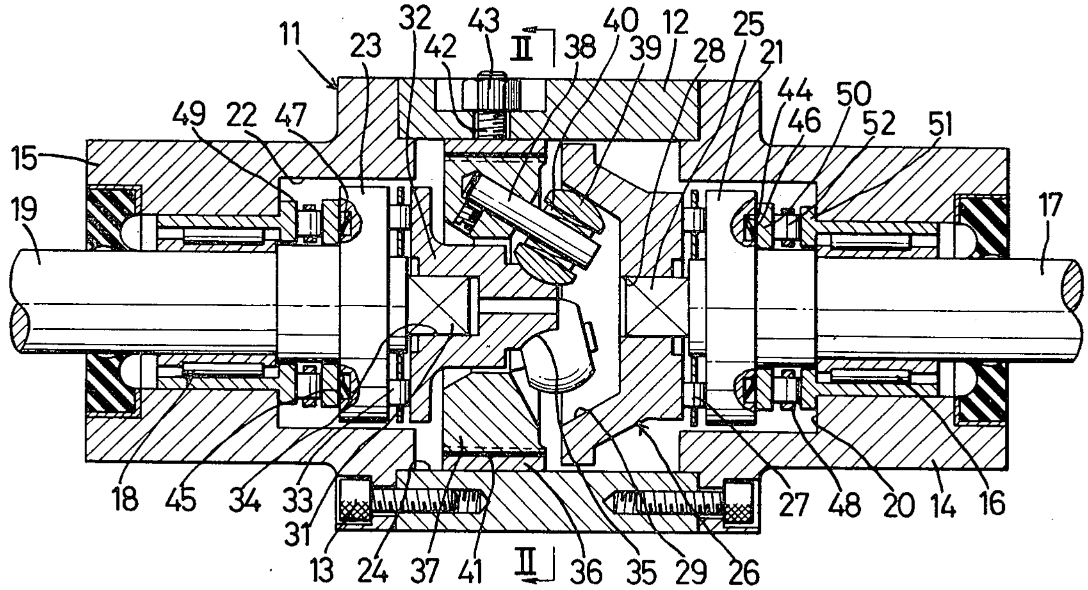
FIG. 1 is a longitudinal sectional front view of this invention device in the first embodiment.
Figure 2:
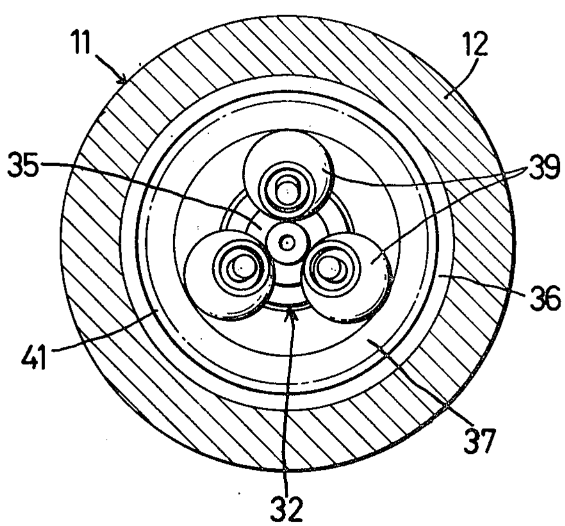
FIG. 2 is a magnified cross-sectional view of part indicated by arrows II — II in FIG. 1.

FIG. 1 and 2 show this invention apparatus of a coupling constitution wherein numeral 11 designates a cylindrical casing accommodating every integral parts of said apparatus, said casing 11 comprising a main body 12 and shaft-bearing cylindrical units 14 and 15 fixed on an axis to said main body 12 at both sides thereof by bolts 13.

Said cylindrical units 14 and 15, shown at right and left in FIG. 1, rotatably and coaxially support shafts 17 and 19 therein via bearings 16 and 18, respectively.

Said shaft 17 at the outer periphery of its end portion abutting against the inside of said casing 11 forms a flange 21 movably locating in a spacious cylindrical recess 20 formed at the inward end portion of said cylindrical unit 14. The other shaft 19 also at the outer periphery of its inward end portion is annularly fixed with a flange 23 movably locating in a spacious cylindrical recess 22 formed at the inward end portion of the other unit 15.

At the inward end portion of said shaft 17 is coaxially adapted a square axle 25 projecting toward an inside space 24 of said main body 12, said square axle 25 being mounted with a dish-like rotary object 26 accommodated within said space 24, between said rotary object 26 and said flange 21 being disposed a group of rollers 27 so as to axially support said object 26.

Said rotary object 26 at its center has a square hole 28 in which said square axle 25 is inserted so that said object 26 may rotate in liaison with said shaft 17 and move axially round said square axle 25. Said rotary object 26 forms a frictional surface 29 at its inside peripheral surface of truncated cone shape abutting against the inward end portion of the other shaft 19, said shaft 19 also being coaxially attached with a square axle 31 projecting toward said inside space 24 whereby a conical rotary object 32 coaxially fits to said axle 31 at a square hole 34 bored coaxially thereon, thereby enabling the synchronized rotation of said square axle 31 and said conical rotary object 32 with said shaft 19. A group of rollers 33 also exist between said conical object 32 and the afore-mentioned flange 23 so as to axially support said object 32.

Said conical rotary object 32 at the outer periphery of its forward portion forms an arc annular recess 35, said recess 35 together with the afore-mentioned friction surface 29 of said dish-like rotary object 26 being so surfaced as to cause gearing frictions with globular rotary members 39 installed between said objects 26 and 32 within said space 24 as referred to in the following, said globular members 39 being of material having a high friction coefficient such as rubber and etc.

Inside the afore-mentioned main body 12 is installed a retainer 37 through the medium of a fitting ring 36 so as to surround said conical rotary object 32 intermediately at its outer periphery. Said retainer 37 is fixed with a plural number of (three in case of this embodiment) axles 38 annularly keeping a predetermined interval with each other and projecting toward the space between said dish-like rotary object 26 and conical rotary object 32, the afore-mentioned globular members 39 each fitting rotatably to said axles 38 each via a bearing 40 so as to frictionally contact with said frictional surface 29 and said annular arc recess 35, said globular members 39 being sandwiched between said rotary objects 26 and 32 in this state.

The afore-mentioned fitting ring 36 engaging with said retainer 37 by a spline 41 is fixed to said main body 12 at its inside periphery by screws 42 and nuts 43 thereby fixing said retainer 37 to said main body 12 in annular direction but enabling axial movement of said retainer 37 independent of said main body 12, this axial movability of said retainer 37 being indispensably required for the development of frictions between said globular members 39 and said friction surfaces 29 and 35.

The afore-mentioned flanges 21 and 23 attaching to said shafts 17 and 19 respectively form annular recesses 44 and 45 respectively at their back (left side in FIG. 1) so as to incorporate springs 46 and 47 respectively therein. Automatic pressure control systems 48 and 49 are further incorporated inside the afore-mentioned spacious cylindrical recesses 20 and 22 respectively at the back of said flanges 21 and 23.

Said springs 46 and 47 are compressed respectively between the innermost ends of said recesses 44 and 45 and said automatic pressure control systems 48 and 49 respectively thereby urging said shafts 17 and 19 respectively inwardly within said casing 11. With said springs 46 and 47 urging said shafts 17 and 19 to bring them closer to each other, the afore-mentioned friction surfaces 29 and 35 (mentioned as arc annular recess of the conical rotary object 32) are brought into a pressing contact with said globular members 39 at their outer peripheral surfaces, with the result that a friction in proportion to the imposed pressure is generated thereby enabling the transmission of rotary movement from the shaft 17 to the opposite shaft 19 or vice versa.

Now a reference will be made to said automatic pressure control system 48, shown at right in FIG. 1, the counterpart system 49 being totally equivalent in constitution and function to 48.

Said system 48 comprises a ring 50 disposed in overlapping state at the back of said flange 21, a diametrically magnified ring 51 formed at the inward end of said bearing 16, and a plural number of rollers 52 sandwiched radially between said rings 50 and 51, said rollers 52 fitting in V-shaped recesses formed at the confronting surfaces of said rings 51 and 52 so that said rollers 52 may tend to run onto said rings as said shaft 17 tends to move outward against said spring 46 due to an excessive load imposed accidentally on said friction surfaces 29 and 35, said excessive load possibly causing a slip on said friction surfaces or a bad effect on the motive power for the input otherwise.

This invention apparatus in the first embodiment constituted as above may be put in practical uses as below.

The shaft 17 is linked with a motor at its rotary shaft (not shown) via any suitable joint, with the casing 11 fixing to the base of said motor via any suitable means. Upon rotating of said shaft 17, said dish-like rotary object 26 rotates in combination therewith thereby transmitting said rotation to said globular members 39 and further to said conical rotary object 32 through frictional contacts of said globular members 39 with said rotary object 26 at its friction surface 29 and with said conical object 32 at its friction surface 35, said globular members 39 retained by said retainer 37 rotating on their axes at their respectively predetermined positions in this state thereby enabling the rotation of said shaft 19 at the output in liaison with the conical rotary object 32, said rotation at the output being reverse in direction to the input as may be readily understood in the drawing.

The motorized rotation of said shaft 17 at the input is accelerated through the simultaneous frictional contacts between these revolving objects in proportion to diametrical ratios between them provided that the relationship between the input, load on the output and further the friction coefficient is kept balanced.

In case of this embodiment, the rotary object 26 at its friction surface 29 measures 2.5 to 1 in diametrical ratio to said globular members 39 each, this ratio signifying one rotation of said rotary object 26 and accordingly said shaft 17 per 2.5 rotations of said globular members 39.

The rotation of said globular members 39 is further accelerated at the output also in proportion to the diametrical ratio between said members 39 each and said conical object 32 at the friction surface 35 thereof, said ratio in this case being 2 to 1 and accordingly said conical member 32 accomplishing two rotations per rotation of said globular members 39 each. Thus the rotating speed of said shaft 19 at the output is accounted five times as fast as that of said shaft 17 at the input.

Also, the topsy-turvy proceeding is available for obtaining a reduction of rotation speed at the output, i.e. the linkage of said shaft 19 with a motor results in the deceleration of rotation of the other shaft 17 at the output, the rotating speed of said shaft 17 being one fifth of the input shaft 19, as may be apparent in the foregoing descriptions.

Figure 3:
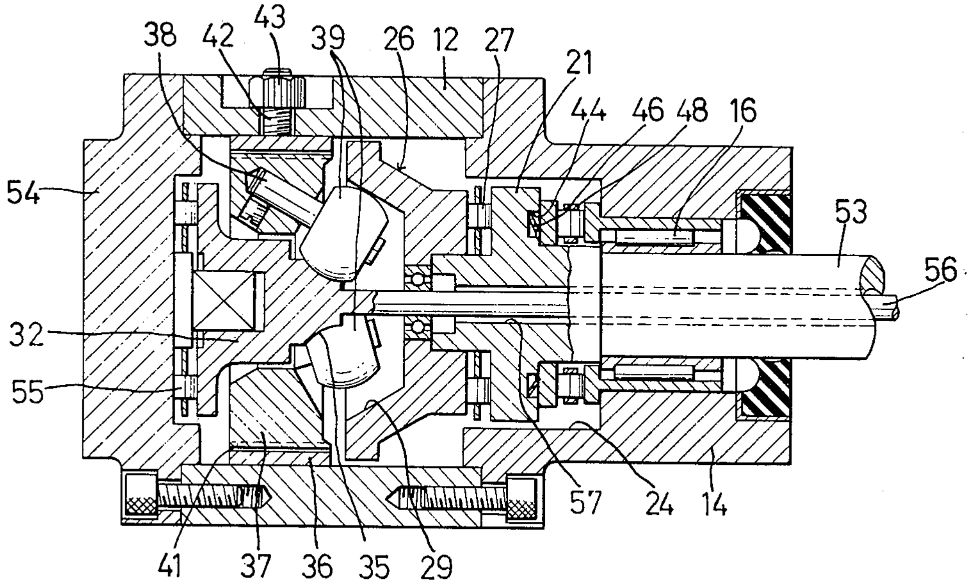
FIG. 3 is a longitudinal sectional front elevation of this invention device in the second embodiment.

Now a description will be given hereinunder on the second embodiment of this invention as manifested in FIG. 3 wherein said apparatus is applicable solely for a stirrer functioning on two blades rotating in opposite directions at different speeds. In this embodiment, parts equivalent in constitutions and functions to those in FIG. 1 and 2 will be designated by the same numerals but explanations therefor will be omitted.

The main body 12 of said casing 11 at its leftward (outward) end is closed by a wall 54, said wall 54 receiving said conical rotary object 32 at its leftward end via rollers 55. An axle 56 extends fixedly rightward from the rightward end of said conical object 32 through a hollow shaft 53 and further out of said casing 11 at its cylindrical unit 14, said shaft 53 having the afore-mentioned dish-like rotary object 26 at its leftward end portion, said shaft 53 being rotatably disposed so as to rotate in combination with a motor through the medium of a pulley and belt, said shaft 53 and axle 56 being disposed within a stirrer so as to connect at their rightward ends to blades each of said stirrer.

Upon starting on rotation of the motor-driven shaft 53, said axle 56 rotates in liaison with said conical object 32 in direction opposite to said shaft 53 at the accelerated speed through the transmission from the input to the output via said dish-like rotary object 26 and globular members 39 as manifested in the foregoing embodiment, thus the attached blades making rotations in directions opposite to each other, one at the accelerated speed and the other at the input rotation speed.

Thus this invention enables the multiplied acceleration or deceleration through the transmission of a provided rotary movement to the output by a simple mechanism that may cost in money and space not more than known apparatuses of the kind.

What is claimed is:

1. An apparatus for accelerating or decelerating the input rotation at the output, said apparatus comprising a cylindrical casing open at both ends wherein two shafts are disposed rotatably on a same axis extending horizontally in opposite directions out of said casing, one of said shafts at its inward end fixing axially to a dish-like rotary object at its center, said rotary object forming a friction surface of a truncated cone shape at its inside periphery facing axially inward, the other shaft at its inward end fixing to an inwardly tapering conical rotary object forming a friction surface at the outer periphery of its inward end portion, said dish-like rotary object and said conical rotary object in this state confronting axially each other at the inside periphery and the inward end portion respectively, a plurality of globular members of a fixed size being rotatably supported by respective axes in between said rotary objects so as to make rotational and frictional contacts simultaneously with both of said friction surfaces, said shafts each being available for the input and the output in alternation, said dish-like rotary object, globular members each, and conical rotary object at their mutually contacting portions measuring diametrically the biggest, 2nd and 3rd in the above-mentioned order so that the rotation of the input shaft may be accelerated or decelerated through its transmission to the output shaft via said rotary objects and said globular members in proportion to ratios between their diametrical lengths.

2. An apparatus for accelerating the input rotation at the output, said apparatus comprising a cylindrical casing closed at one end wherein are rotatably disposed two shafts so as to extend axially in the same direction out of said casing in the state that one of said shaft extends through the inside of the other shaft, the inner shaft reaching farther than the covering shaft, said covering shaft at its inward end fixing axially to a dish-like rotary object at its center, said object forming a friction surface of a truncated cone shape at its inside periphery facing the closed side of said casing, the inner shaft at its inward end fixing to the forward tip of a forwardly tapering conical rotary object facing the open side of said casing, said conical object forming a friction surface at the outer periphery of its forward end portion, a plurality of globular members of a fixed size being rotatably supported by respective axes in between said rotary objects so as to make rotaional and frictional contacts simultaneously with both of said friction surfaces, said dish-like rotary object, globular members each and conical rotary object at their mutually contacting portions measuring diametrically the biggest, second and third in the above-mentioned order so that the rotation of said covering shaft at the input may be multiplied through its transmission to the inner shaft at the output via said rotary objects and globular members.

* * * * *